(12) United States Patent
Karim et al.

(10) Patent No.: US 11,755,951 B2
(45) Date of Patent: Sep. 12, 2023

(54) MACHINE LEARNING WITH AN INTELLIGENT CONTINUOUS LEARNING SERVICE IN A BIG DATA ENVIRONMENT

(71) Applicant: VMWARE, INC., Palo Alto, CA (US)

(72) Inventors: Ayesha Karim, Bangalore (IN); Aishwary Thakur, Bangalore (IN); Reghuram Vasanthakumari, Bangalore (IN); Dinesh Babu Thirukondan Gnaneswaran, Bangalore (IN); Naveen Adarsh Petla, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 402 days.

(21) Appl. No.: 16/938,942

(22) Filed: Jul. 25, 2020

(65) Prior Publication Data
US 2021/0357805 A1    Nov. 18, 2021

(30) Foreign Application Priority Data
May 15, 2020    (IN) .............................. 202041020510

(51) Int. Cl.
G06N 20/00    (2019.01)
G06F 3/0482    (2013.01)
G06F 17/18    (2006.01)

(52) U.S. Cl.
CPC .......... *G06N 20/00* (2019.01); *G06F 3/0482* (2013.01); *G06F 17/18* (2013.01)

(58) Field of Classification Search
CPC ........ G06N 20/00; G06F 3/0482; G06F 17/18
USPC .......................................................... 706/11
See application file for complete search history.

(56) References Cited

U.S. PATENT DOCUMENTS

| | | | |
|---|---|---|---|
| 2008/0215513 A1* | 9/2008 | Weston .................. | G06N 20/10 706/13 |
| 2017/0193066 A1* | 7/2017 | Zhu ....................... | G06F 16/254 |
| 2017/0193392 A1* | 7/2017 | Liu ......................... | G06N 20/00 |
| 2018/0247224 A1* | 8/2018 | Garcia Duran ......... | G16H 50/20 |
| 2018/0247227 A1* | 8/2018 | Holtham ................ | G06N 20/00 |
| 2019/0130275 A1* | 5/2019 | Chen ....................... | G06N 3/048 |
| 2019/0325621 A1* | 10/2019 | Wang ...................... | G06N 20/00 |

(Continued)

OTHER PUBLICATIONS

Chen. Z., "Learn as "Humans" do for Artificial General Intelligence (AGI)", Lifelong and Continual Learning, B. Liu, Morgan 8 Claypool, Aug. 2018 (1st edition, 2016)., Aug. 2018.

(Continued)

*Primary Examiner* — William D Titcomb
(74) *Attorney, Agent, or Firm* — Clayton, McKay & Bailey, PC

(57) ABSTRACT

An example system can provide intelligent continuous learning by updating a machine learning model based on a new dataset. The system can utilize a transfer loss function that does not depend on old datasets used to train the existing model. The system can receive, on a graphical user interface ("GUI"), a selection of configuration criteria including threshold performance for automatic deployment. The new model can be created iteratively based on the configuration criteria. An evaluation of the new model over multiple iterations can be presented on the GUI. In an instance where the new model meets a deployment requirement selected on the GUI, a server can deploy the new model in place of the existing model.

20 Claims, 5 Drawing Sheets

(56) References Cited

U.S. PATENT DOCUMENTS

| | | | | |
|---|---|---|---|---|
| 2019/0340534 | A1* | 11/2019 | McMahan | G06N 20/00 |
| 2020/0050943 | A1* | 2/2020 | Ishii | G06N 3/045 |
| 2020/0110982 | A1* | 4/2020 | Gou | G06N 5/01 |
| 2020/0202171 | A1* | 6/2020 | Hughes | G06N 3/08 |
| 2021/0019249 | A1* | 1/2021 | Gnaneswaran | G06N 20/00 |
| 2021/0042811 | A1* | 2/2021 | Lancewicki | G06Q 30/0631 |
| 2021/0064934 | A1* | 3/2021 | Swaminathan | G06V 10/82 |
| 2021/0065052 | A1* | 3/2021 | Muralidharan | G06N 3/04 |
| 2021/0124604 | A1* | 4/2021 | Thakur | G06N 20/00 |
| 2021/0125002 | A1* | 4/2021 | Thakur | G06F 18/214 |
| 2021/0287096 | A1* | 9/2021 | Patney | G06T 7/0012 |
| 2021/0334630 | A1* | 10/2021 | Lambert | G06N 3/047 |

OTHER PUBLICATIONS

Li, Zhizhong , "Learning without Forgetting", and Derek Hoiem, Member, IEEE.

Lomonaco, Vincenzo , "Why Continual Learning is the Key Towards Machine Intelligence", Oct. 4, 2017.

\* cited by examiner

CONTINUOUS LEARNING SERVICE

NEW CONTINUOUS LEARNING CONFIGURATION — 400

CONFIGURATION NAME
CONTINUOUS ML 1 — 405
ENTER CONFIGURATION NAME

SCHEDULE
○ DAILY ● WEEKLY ○ MONTHLY — 410
SELECT TRAINING SCHEDULE

DATA SOURCE URL
HTTP://10.196.76.104:10001/DATASET — 415
ENTER DATA SOURCE URL

☑ AUTO DEPLOYMENT — 420
☐ AUTO TRAINING — 430

THRESHOLD
70 — 435
THRESHOLD FOR AUTO DEVELOPMENT OF MODEL %

[SAVE] — 440  [CANCEL]

EXECUTIONS — 445
REPORTS — 450

FIG. 4

MACHINE LEARNING WITH AN INTELLIGENT CONTINUOUS LEARNING SERVICE IN A BIG DATA ENVIRONMENT

RELATED APPLICATIONS

Benefit is claimed under 35 U.S.C. 119(a)-(d) to Foreign Application Serial No. 202041020510 filed in India entitled "MACHINE LEARNING WITH AN INTELLIGENT CONTINUOUS LEARNING SERVICE IN A BIG DATA ENVIRONMENT", on May 15, 2020, by VMware, Inc., which is herein incorporated in its entirety by reference for all purposes.

BACKGROUND

Machine learning ("ML") is heavily relied on to solve complex real-world problems. To do so, machine learning can analyze a dataset and build a model. The model can then be used to make predictions based on additional data. However, building a predictive model is not a one-time job. Instead, new models must be created based on new data in order to maintain effectiveness as trends change.

In the current era of big data, analytics processes deal with huge volumes of data in multiple varieties and with high velocity. It is both time consuming and expensive to retrain a model based on massive new datasets. The complete dataset accumulates over time and is not readily available at one time. It can take days or weeks to train a model based on large datasets. During training, new datasets are accumulating. Therefore, as soon as a model is trained, it can begin becoming obsolete again. Existing systems do not have a way to retrain and redeploy models without significant downtime or delay between retraining. Updating the models requires large computing power if training has to be done on large amounts accumulated data. The more data accumulates, the more processing is required for the training. Eventually, the requisite processing power is unavailable.

In the ML and artificial intelligence technology space, continuous learning from newly arriving data streams is a fast-emerging topic. Transfer learning is a relatively new ML approach where knowledge gained from one task can be passed on to new models while learning new tasks. Transfer learning has wide applications in spam filtering, text classification, and other classification areas. The goal of transfer learning is to remember previously learned knowledge without having to store or load the entire previous datasets. However, current transfer learning processes often cause the model to become less accurate with regard to earlier datasets. Current methods do not maintain the model's knowledge and accuracy over time.

As a result, a need exists for systems and methods that intelligently continuously learn and update a model in a big data environment.

SUMMARY

Examples described herein include systems and methods for continuous machine learning in a big data environment. In one example, the system can allow an administrative user to configure when a model constructed with machine learning will be retrained and redeployed based on new datasets. A console with a graphical user interface ("GUI") can allow the user to set configuration criteria to determine when a model is retrained, what dataset source is used, and under what conditions a new model can be automatically deployed in place of an existing model. The GUI can also provide comparative analytics so the user can see how a new model or version of a new model compares against the existing model or a different version of the new model. This can allow the user to understand or explain how the new model is better from a performance standpoint than a prior or existing model. The new model can be deployed into a production environment if performance of the new model is better than the existing model.

In one example, the GUI can receive a selection of configuration criteria for retraining an existing model with a new dataset. The configuration criteria can specify a schedule for retraining an existing model and also a source for a new dataset. The configuration criteria can include whether to automatically deploy a new model and threshold performance criteria for when automatic deployment applies. The configuration criteria can be sent to a moderator service that schedules the training with a continuous management server.

The continuous management server can then begin retraining based on a new dataset at the scheduled time. This can include creating multiple iterations of a new model and determining a transfer loss for the new model. The transfer loss can be determined without using the prior dataset, leading to significant processing improvements. The configuration criteria for deploying a new model can require that the transfer loss be below a threshold. If multiple versions of the new model have the requisite transfer loss, then the best performing of the versions can be deployed.

To determine the transfer loss for the new model, the continuous management server can determine a first loss of a new dataset using the new model and a second loss of the new dataset using the existing model. The first and second losses can be calculated using loss functions, such as a means-squared error loss function, entropy loss function, or a root-squared error loss function. Additionally, at least one of the first and second losses can be scaled based on a balancing parameter. The balancing parameter can be automatically adjusted to decrease the transfer loss in an example. For example, the balancing parameter can be minimized and multiplied against the second loss to increase the reliance on accuracy of the new model while keeping the overall transfer loss below a required threshold.

The GUI can display an evaluation of the new model over multiple iterations with regard to transfer loss. This can include a comparative analysis between versions of the new model or a comparison with the existing model. This can allow for quick administrative user approval when a model is ready for redeployment. For example, the administrator can verify that the new model improves over the existing model or other acceptable versions of the new model. In one example, if the user does not intervene, automatic deployment can occur. The user may have a time window in which they can decline deployment or switch which version of the new model gets deployed.

In one example, in an instance where the new model exceeds a performance metric of the existing model and meets a deployment requirement selected on the GUI, the continuous management server can deploy the new model in place of the existing model. This can include providing the new model within a production environment. The new model can then be treated as the existing model, and continuous learning can occur based on the schedule and further refinements in view of a new dataset. The prior analyzed dataset need not be revisited, in an example. This can ensure that the model continuously updates with minimal user involvement, decreasing complexity, minimizing processing expense, all while maintaining the model's performance levels.

Under this approach, the system need not save previous outputs from the prior datasets, in an example. The system instead can focus on new datasets through use of the loss function applied to both a new model and the existing model.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 4 is an example illustration of a GUI screen for setting criteria for use in intelligent continuous learning.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example system, a continuous management server can retrain machine learning models using a continuous learning technique that does not require use of old datasets or the results from the old data sets. Instead, models can be updated based on a transfer loss function that includes a loss balancing parameter that can be minimized while maintaining a threshold maximum level of transfer loss.

A GUI that interfaces with the continuous management server through a moderator service can allow the user to set retraining criteria. The criteria can include scheduled retraining intervals and minimum performance levels required for automated deployment of a new model.

Figure 1:
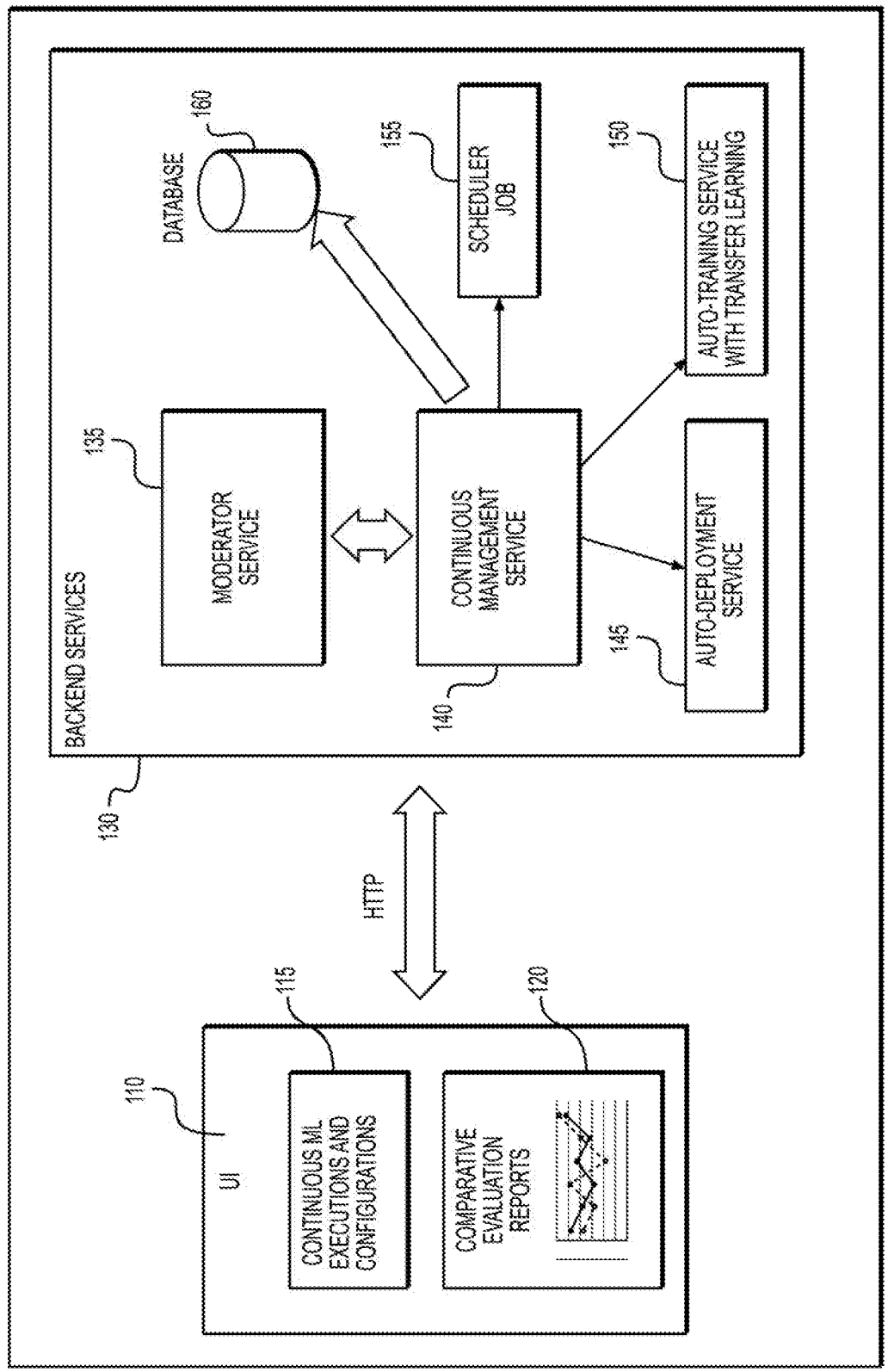
FIG. 1 is an example illustration of system components for an intelligent continuous learning service.

FIG. 1 is an example illustration of system components for an intelligent continuous learning service. Backend services 130 can execute on one or more servers, including a continuous management server. The continuous management server can execute a continuous management service 140 that can train new models at scheduled times and deploy new models meeting criteria chosen by a user. A server, such as the continuous management server, can include one or more processors. The server can also include one or more physical or virtual servers in communication with one another.

The continuous management service 140 can interface with a moderator service 135. The moderator service 135 can send and receive information between the continuous management service 140 and a console GUI 110, in an example. The GUI 110 can be displayed, for example, on a user device. The user device can be any processor-enabled device, such as a laptop, phone, tablet, or personal computer. In one example, the GUI 110 is generated from a web server that the user can reach using a web browser or a frontend of an application on a user device.

The GUI 110 can allow the user to set configuration criteria 115 for continuous machine learning with respect to a model in a production environment. The user can access a screen for setting the criteria 115, in an example. The criteria 115 can include, for example, scheduling intervals for retraining a selected model using new datasets at a network location, such as daily, weekly, or monthly. The GUI 110 can also allow the user to specify a threshold accuracy level for a new model to be automatically deployed.

These configuration criteria 115 can be passed from the GUI 110 to the moderator service 135. The moderator service 135 can then notify the continuous management service 140 of the new configuration criteria 115. The moderator service 135 can use POST methods to create a configuration object that the continuous management service 140 can understand. The moderator service 135 can also notify the continuous management service 140 that a new configuration object is available.

The moderator service 135 can execute on a server that can be the same or different than the continuous management server. The moderator service 135 can be implemented using PYTHON FLASK as a webservice, in one example. The GUI 110 can be a browser or application on the user device that communicates over a network, such as the internet, with the moderator service 135. The communications can occur using hypertext transfer protocol ("HTTP") in an example. The moderator service 135 can include an API for sending and receiving information with the continuous management service 140, in an example. This can allow the moderator service 135 to retrieve information for display on the GUI 110.

The continuous management service 140 can store configuration criteria 115 in a database 160. For example, scheduling information can be added to the database 160. Additionally, the latest dataset, the existing model that is currently deployed, the next model training date, and evaluation metrics can all be stored in the database 160, in an example. The database 160 can include a physical non-transitory, computer-readable medium for storing information. The database can be a SQL database or a MongoDB NoSQL database in various examples.

In one example, the continuous management service 140 can create a scheduler job 155 from the user-defined configuration criteria 115. The scheduler job 155 can include the intervals at which the job will run and details about the job. For example, the job can include one or more of training a new model with a dataset at a source location, comparing the new model(s) against deployment criteria, and deploying a new model that meets the criteria.

The continuous management service 140 can include or start additional services that perform tasks related to model training and deployment. An auto-training service 150 can use a continuous learning technique that does not require use of old datasets or the results from the old data sets. Instead, models can be updated based on a transfer loss function that includes a loss balancing parameter that can be minimized while maintaining a threshold maximum level of transfer loss. The transfer loss can be the sum of a first loss for the new model using the new dataset and a second loss for the old model using the new data set. The transfer loss can represent an error rate, in an example. The loss functions used for the first and second losses can provide information regarding how well a model performs, providing a measurement of prediction error. The loss function can represent a cumulative loss of a new dataset (i.e., task) using the original model and the new dataset using a new model.

To determine transfer loss, old datasets are not needed in an example. Instead, the new dataset at the source specified in the configuration criteria 115 can be used with both a proposed new model and the existing model in determining the transfer loss. This can greatly increase computational efficiency as compared to prior methods of continuous learning. However, the new model can still retain prior knowledge of the existing model. The loss functions used can be developed in Keras TensorFlow, in an example.

The new model can then be iteratively generated to optimize based on the transfer loss, in an example. The new model can be trained over numerous iterations that create different versions of the model, in an example. In one example, the loss balancing parameter can be adjusted as part of optimizing the model. This can result in a lower transfer loss.

Comparing the performance against different models can also be visualized in a user friendly visual comparative model analysis report 120. The reports can display optimized models that best fit the data and that have the highest accuracy. These can be candidate versions to eventually deploy to production systems.

If the new model meets performance criteria specified by the user, such as a threshold accuracy level, the new model can be marked for automatic deployment. In one example, if multiple versions of the new model meet the threshold, the version with the highest relative metrics can be chosen as the new model. For example, metrics like precision, recall, and variance can be compared between versions. In addition, the metrics can be compared against those of the existing model. If the performance criteria and metric thresholds are met, the continuous management service can schedule an auto-deployment of the new model with the auto-deployment service 145. The auto-deployment service 145 can be an application or process that deploys the new model into a production environment in place of the existing model.

In one example, the moderator service 135 can report comparative evaluations of the new model as compared to the existing model in comparative evaluation reports 120. These reports 120 can allow the user to see the progress being made with the continuous learning. Alternatively, the reports 120 can also allow the user to intervene if new models do not have the desired metrics. In one example, the comparative evaluation reports 120 can compare different versions of the new model, allowing the user to select which version should be used as the new model. This can be useful when different versions have varying success across different metrics, with no version unanimously performing best across all metrics. In that case, the user can see the tradeoffs between the versions and select which version to use as the new model. The user can also use the comparative evaluation reports 120 to adjust the configuration criteria 115, such as setting new performance thresholds and prioritizing some metrics over others. This can help the user ensure that future automated continued learning will need less and less of their input.

In this way, an example system for automatic continuous learning can make the retraining and deployment process computationally efficient, optimal, faster, and less complex for developers—all while maintaining an existing model's performance.

Figure 2:
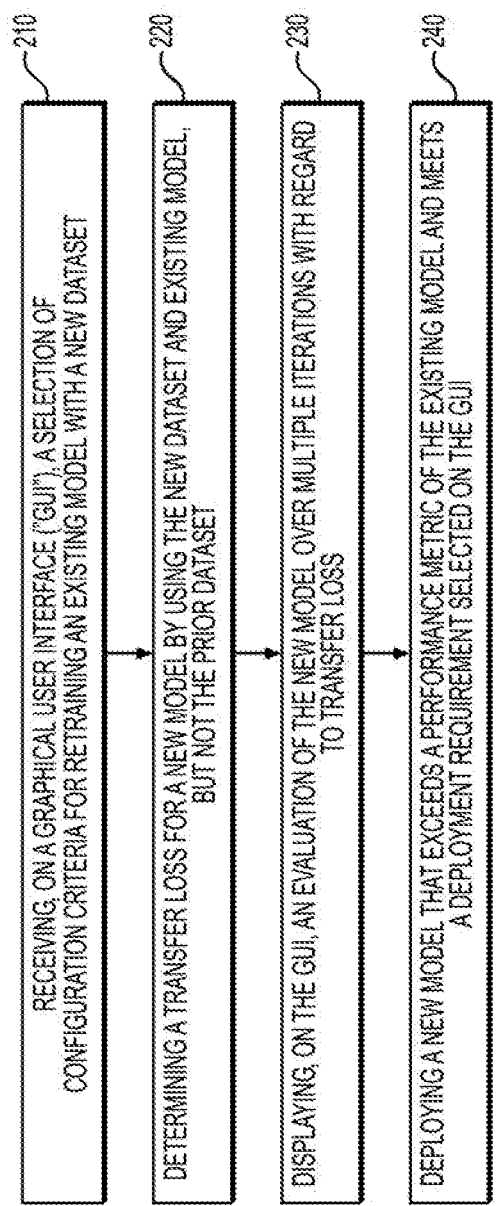
FIG. 2 is an example flow chart with stages for performing intelligent continuous learning.

FIG. 2 is an example flow chart with stages for performing intelligent continuous learning. At stage 210, the GUI can receive a selection of configuration criteria for retraining an existing model with a new dataset. The user can select a model to update and select a source where new datasets periodically become available. The user can also schedule the intervals for training new models based on the new dataset. The selection of configuration criteria can further specify whether to auto-deploy a new model that meets performance thresholds, such as 70% accuracy. All of the selections made by the user on the GUI to schedule and set the bounds of the retraining can be part of the configuration criteria.

At stage 220, the continuous management server can determine a transfer loss for a new model without using the prior dataset. Instead, the continuous management server can use the new dataset and the existing model.

To determine the transfer loss, the continuous management server can determine a first loss of a new dataset using the new model and a second loss of the new dataset using the existing model. At least one of the first and second losses can be scaled based on a balancing parameter. The balancing parameter can be adjusted over iterations of creating the new model to decrease the transfer loss, in an example. The auto-training service 150 can compute loss functions on behalf of the continuous management server, in an example.

In one example, the transfer loss is determined based on Equation 1, below.

$$\text{TransferLoss} = L_n(\text{act}_n, \text{pred}_n) + \lambda L_o(\text{pred}_o, \text{pred}_n) \quad \text{Equation 1}$$

In this equation, $L_n$ can represent the first loss for the new task (i.e., dataset) and new model, such as by using actual labels and predicted labels as inputs. $L_o$ can represent the second loss for the old (existing) model using the new task, such as by using predicted labels from both the new and existing model as inputs. Both the first and second losses can be determined with loss functions. The loss functions used can vary between examples. For example, a means-squared error loss function, entropy loss function, or a root-squared error loss function can be used as the loss function.

$L_n$ can compare the actual label for a new dataset to the predicted label for the new model. $L_o$ can compare the predicted label of the new dataset with the existing model against the predicted label with the new model. The variable $\text{act}_n$ can be the actual label or output for new dataset, whereas $\text{pred}_n$ is the predicted label with the new model and $\text{pred}_o$ is the predicted label of the new dataset with the old (existing) model. A predicted label is a model output for particular input data of the new dataset. The actual label can be the correct output for the input data, which can be included with the task (i.e., dataset). The label itself can be an integer that corresponds to a more detailed result in a table or class. For example, in recognizing clothing articles, 0 can correspond to a t-shirt, 1 to trousers, 2 to a pullover, 3 to a dress, 4 to a coat, and so on. A new dataset for training can have any number of labels. A new task can represent the predicted output of the model.

Lamda ($\lambda$) can act as a loss balancing parameter. The loss balancing parameter can be set to a minimum value while still maintaining a threshold accuracy or transfer loss level. The loss balancing parameter can be adjusted to minimize the transfer loss, in an example.

The transfer loss can be used to optimize the model during multiple iterations of model generation. For example, to compile a model using Keras, an optimizer can use a loss balancing parameter between 0.1 and 0.001, in an example. The optimizer, such as a Keras optimizer, can run a gradient descent loss optimization algorithm in one example. The gradient descent can optimize coefficients of the algorithms that form the ML model, in an example. For example, coefficients of regression and classification algorithms can be optimized using the gradient descent. For example, an existing model can be based on a linear regression algorithm modeling an initial dataset. During the retraining iterations, mean-squared error ("MSE") can be used as a loss function. MSE can be computed for the new task using the prior (existing) model and the new task using the new model. Then transfer loss can be computed using Equation 1. Gradient can be computed for each of the parameters and new weights calculated. This can be iteratively repeated to reach a minimum transfer loss, in an example. The number of iterations can be specified as part of the configuration criteria 115, in an example.

At stage 230, the GUI can display an evaluation of the new model over iterations with regard to the transfer loss. This can include a plotted graph of the new model relative to transfer loss as a result of the gradient descent. The evaluation can also show metrics for the model, such as accuracy, precision, recall, variance, and others.

In one example, the evaluation is part of a comparative analysis report displayed on the GUI. When one or more versions of a new model meet the performance thresholds, they can be compared in an example. This can include showing multiple model plots on the same screen along with relative metrics for each model.

In one example, the GUI can display the evaluation prior to auto-deployment. The continuous management server can notify the user that the evaluation is available, such as with a message or an alert through the moderator service. The user can then review the evaluation and either approve deployment or manually abort or change deployment when auto-deployment is scheduled.

At stage 240, the new model can be automatically deployed if it exceeds a user-defined threshold. In one example, this can include deploying if the new model exceeds a performance metric of an existing model and meets a deployment requirement selected on the GUI. The deployment requirement can be an accuracy threshold, in an example, and can be part of the configuration criteria 115. The performance metric can be an error rate with regard to the new dataset, in an example. In this way, if the new model performs worse than the existing model with regard to the new dataset, it will not be deployed, in an example.

Additionally, where multiple versions of the new model exceed the deployment requirement and performance metrics needed for deployment, the best performing version can be deployed as the new model. The best performing version can be identified based on highest accuracy, in an example. However, other metrics can also be prioritized for choosing the best version.

In one example, the continuous management server can perform container-based deployment of the new model to a virtual machine ("VM") in a network cloud. The new model can replace the old model in that environment. The new model then can become the existing model that is used in production. Continuous learning and retraining for new models can occur according to the scheduled intervals, as selected, as part of the configuration criteria 115. New datasets can continue to be collected at the source location, from which future new models can be trained. This can allow for scheduled deployments of updated models with minimal developer involvement.

Figure 3:
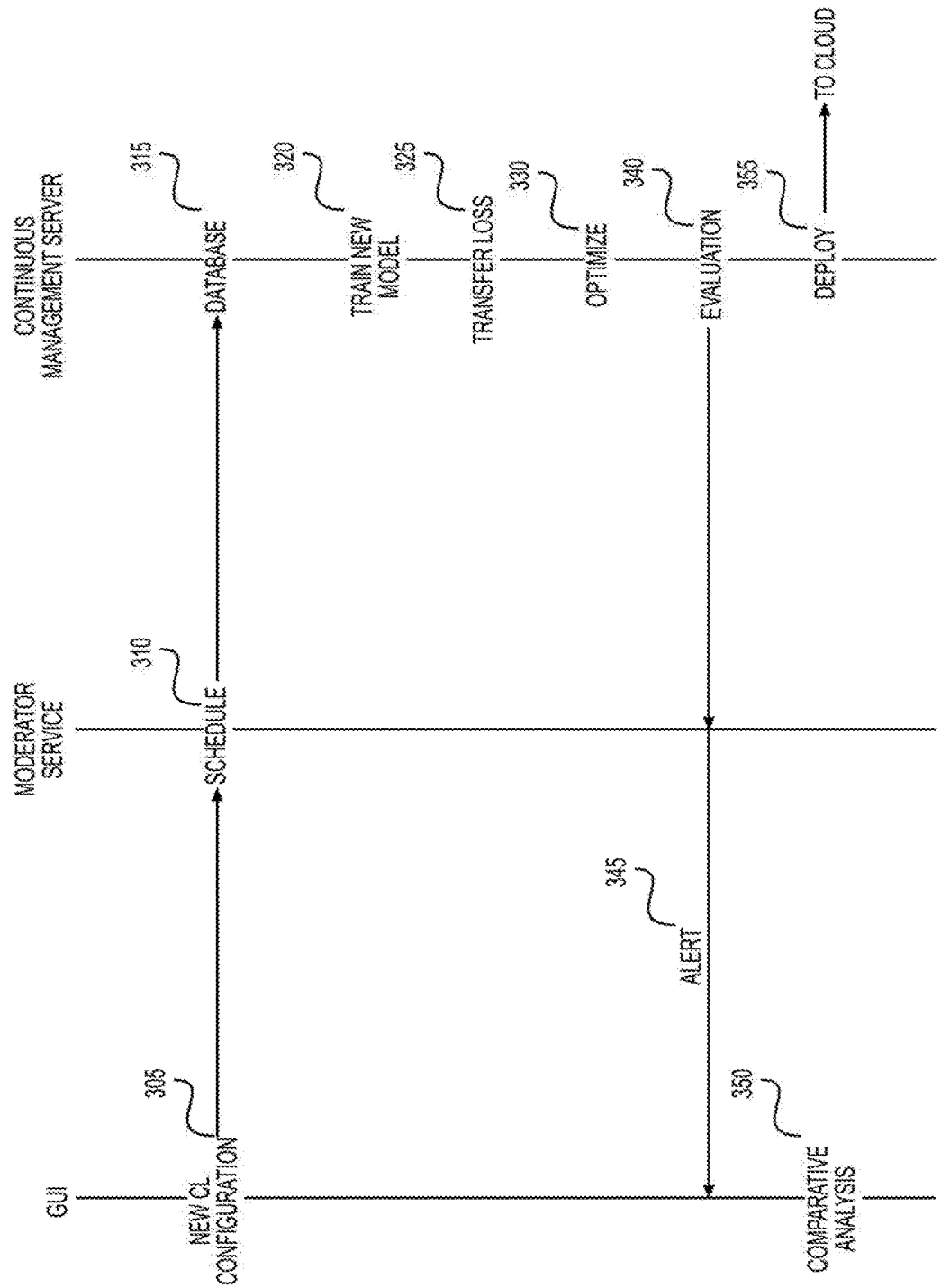
FIG. 3 is a sequence diagram of an example method for intelligent continuous learning.

FIG. 3 is a sequence diagram of an example method for intelligent continuous learning. At stage 305, a user can use a GUI to enter a new continued learning ("CL") configuration. The CL criteria can also be referred to as configuration criteria 115, in an example. The CL criteria can include a scheduled interval, such as a day, week, or month, for continuous learning. The CL criteria can also include a user-defined threshold for auto-deployment. For example, the user-defined threshold can be an accuracy level of the new model.

The GUI selections can be received by a moderator service 135 at stage 310. The moderator service 135 can then schedule the continuous learning at the continuous management server. At stage 315, the continuous management server can update a database with the CL criteria (i.e., configuration criteria).

At stage 320, when a scheduled time occurs, the continuous management server can begin training the new model based on the new dataset. The new model can be trained and built using Tensorflow Keras, in an example. In that platform, the model.compile function takes loss, optimizer functions, and metrics as evaluation parameters.

The loss parameter can be set based on a transfer loss function, which can be determined at stage 325. In one example, transfer loss is determined using Equation 1, above. The loss functions within Equation 1 can be MSE loss functions in an example. A first loss (e.g., new task loss) can be the MSE loss based on actual and predicted labels for the new dataset using the new model. The second loss can be the MSE loss based on predicted labels for the old model versus predicted labels for the new model, both based on the new dataset.

An example code section is presented below as Table 1.

TABLE 1

```
def custom_transfer_loss(lambda=0, y_old_model, y_new_modal):
    from keras import backend as K
    #nested loss function
    def loss_function (y_act, y_pred):
        task_new_loss = MSE(y_act, y_pred)
        transfer_loss = task_new_loss
        transfer_loss += transfer_loss +
        MSE(y_old_model,y_new_modal)
    return transfer_loss
return loss_function
```

In the example of Table 1, a custom transfer loss function can take as parameters lambda, the old (existing) model and the new model. Then a loss function can be applied with MSE on y_act and y_pred, which represent actual and predicted labels using the new dataset with the new model. That function can form a first portion of the transfer loss. A second portion can be formed by MSE using predicted labels from the old and new models, based on the new data. The second portion can also be multiplied against lambda in an example.

At stage 330, the new model can be optimized over iterations. An optimizer can optimize coefficients and weights used in machine learning algorithms that generate versions of the new model. Example algorithms can include perceptron, linear regression, logistic regression, and ridge regression learning algorithms. These algorithms all have coefficients and weights that can be optimized using a gradient descent. In one example, the optimizer receives a learning rate for the pace of weight adjustments. This functionality can be performed by a training service 150 in an example.

Example code to build a new model using an optimizer is shown below in Table 2.

TABLE 2

```
def build_model( ):
    model = keras.Sequential( ) #based on type of algorithm to build
    learning_rate = 0.001
    transfer_loss = custom_transfer_loss(lambda=0.1, y_o, y_n)
    optimizer = tf.train.GradientDescentOptimizer(learning_rate)
    model. compile (optimizer=optimizer, loss = transfer_loss, metrics
=['accuracy','mse'])
        model.fit(dataset, labels, batch_size=1000,epochs=10)
return model
```

In the example of Table 2, transfer loss is calculated using the function from Table 1 with a balancing parameter (lambda) value of 0.1. In this example, 0.01 is the default, but otherwise the balancing parameter can be set to the learning rate (e.g., 0.001). The optimizer then is set to train based on a gradient descent at the learning rate. A model is constructed using the optimizer, the transfer loss, and the metrics "accuracy" and "MSE" (means-squared error). These are the parameters that will be returned for the compiled new model, in an example.

At each iteration, the optimizer can change a loss parameter. For example, the optimizer can change the balancing parameter (lambda). The optimizer can also change the loss function itself ($L_o$) to a different type of function. In one example, the optimizer attempts to increase accuracy by reducing loss. Generally, the goal is to optimize the model's performance.

Model.fit is a function that can create the model multiple times. The iterations are set to a batch size of 1000, with ten epochs, in an example. In that example, ten cycles of training will occur for each iteration. At each iteration, the model can be fed the new dataset and corresponding labels. Epochs can change the order in which the dataset is processed during the machine learning, in an example. In this way, the system can create different versions of the model, in an example, prioritized based on the metrics (e.g., accuracy or MSE).

At stage 340, the generated models can be evaluated. This can include ranking models based on performance and generating a model evaluation report. In one example, only models with accuracy above a user-defined threshold are auto-deployed. However, other versions of the model can still be included in the model evaluation report, in an example.

The GUI or other application can be alerted at stage 345 by the moderator service regarding the availability of the evaluation report. The report can show different versions of the model built with different types of ML algorithms, in an example. The report can allow the user to visually compare accuracy of the set of models, in an example. The comparative analysis can be shown on the GUI screen at stage 350. The user can adjust the CL configuration in an attempt to emphasize models with desired metrics, in an example. This can return the process to stage 305.

During comparative analysis of stage 350, the GUI can also give the user an option to select a version to deploy, in an example. This can allow the user to choose between versions of a new model that meet the user-defined thresholds but also have different performance metrics. In another example, the GUI can allow the user to abort an auto-deployment of a version or change which version will auto-deploy. Such changes can be sent back to the continuous management server, in an example.

At stage 355, the continuous management server can deploy the new model to a production environment in the cloud. In one example, the deployment is based on a selection made by the user on the GUI, such as in the comparative analysis screens. In another example, the deployment is automatic based on the CL configuration. For example, if the new model has an accuracy value that is greater than the threshold chosen by the user, the continuous management server can deploy the new model automatically. The automatic deployment can occur after a delay, in an example. The user can be notified on the GUI that automatic deployment will occur, thus giving the user a chance to review the new model analytics and change, stop, or delay the automatic deployment if needed.

FIG. 4 is an example illustration of a GUI screen 400 for setting criteria for use in intelligent continuous learning. In one example, the GUI includes options for executions 445 and reports 450. The executions 445 option can bring up screen 400, which can include various options for creating configuration criteria.

In this example, the user can name the configuration by typing a name into field 405. Because multiple different configurations can be stored and utilized, naming the configuration can help the user track which configurations to activate and which to deactivate.

The screen 400 can also have scheduling options 410. In this example, the user can schedule intervals for training new models using continuous learning. The options can be radio buttons for selecting between daily, weekly, or monthly training intervals. However, other controls, such as a calendar or field for entering an exact interval (e.g., days or hours), can be provided in other examples.

The screen 400 can also provide an address field 415 or other option for identifying one or more sources of new datasets. The user can provide a network address where a new dataset is or will be available. This can allow the continuous management server to know where to retrieve the new dataset and corresponding labels for a task. In this example, the user has entered a uniform resource locator ("URL") that links to the new dataset.

The screen 400 can allow the user to select options 420, 430 to indicate whether automatic deployment and automatic training should occur at the scheduled intervals. When automatic training is enabled at option 430, the continuous management server can generate new models based on the dataset at the network address. Then the user can be notified of new models that are available for view in the reports 450 tab.

When automatic deployment is enabled at option 420, the best new model generated from the scheduled training can be automatically deployed into the production environment. Deployment can be contingent on the new model meeting other configuration criteria, include user-defined performance thresholds. In this example, a performance threshold 435 for accuracy is set by the user to 70 percent. This means the new model must be at least 70 percent accurate in order to be deployed.

Other performance thresholds can be created on the GUI screen 400 in another example. The GUI screen 400 can also specify loss functions to utilize in creating the new model, such as MSE. These functions can be utilized in determining the transfer loss in an example. Additionally, the GUI can allow the user to select parameters for use by an optimizer performing gradient descent loss optimization. For example, the user can specify the learning rate, which can dictate how rapidly the optimizer adjusts weights and parameters of the machine learning algorithms.

When the user has finished entering configuration criteria, the user can save the configuration with button 440. This can cause the moderator service 135 to send a configuration object to the continuous management service 140, which then schedules the retraining and deployment based on the configuration criteria.

Figure 5:
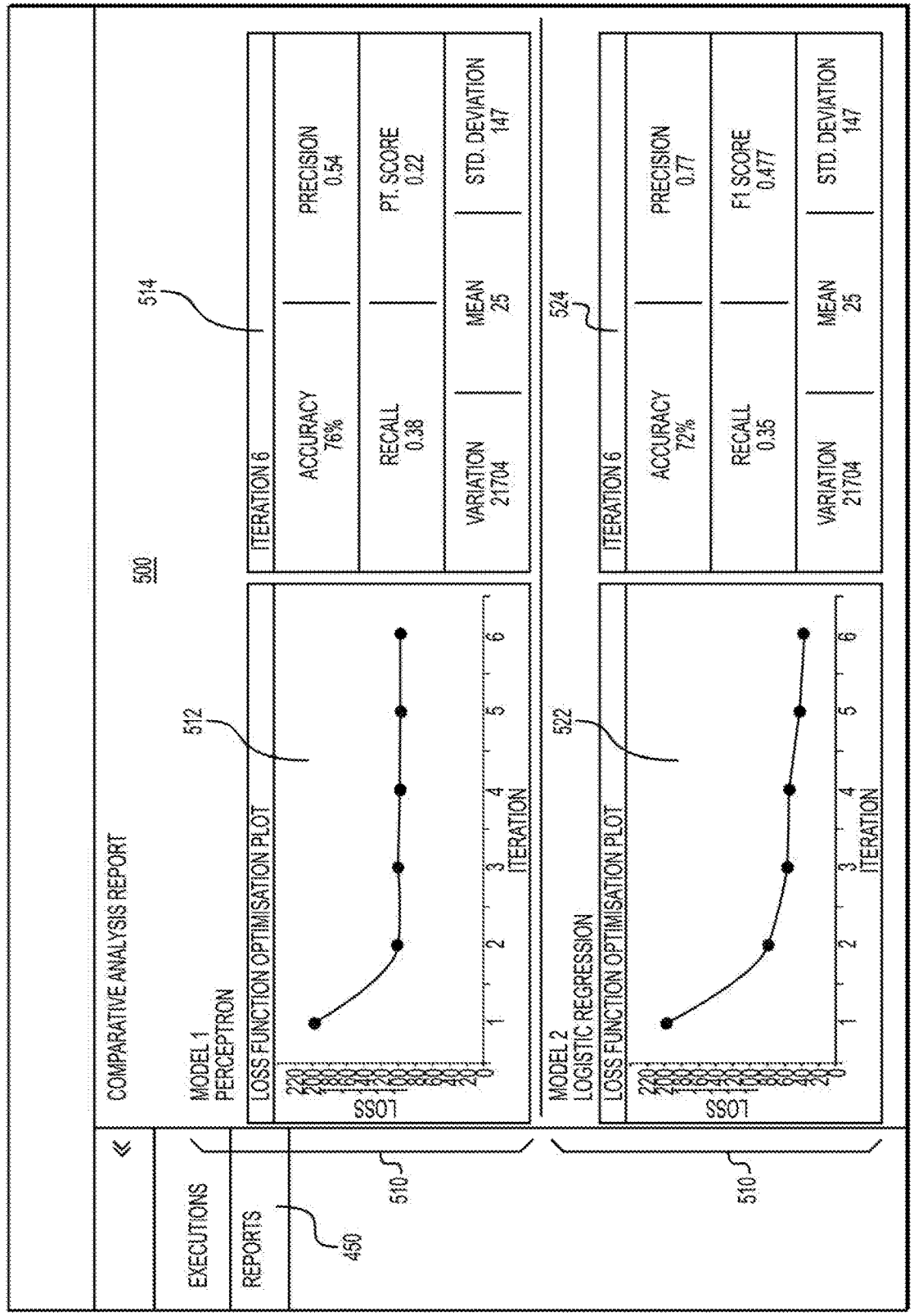
FIG. 5 is an example illustration of a GUI screen for comparative analytics of models in an intelligent continuous learning service.

FIG. 5 is an example illustration of a GUI evaluation screen 500 for comparative analytics of models in an intelligent continuous learning service. Evaluation screen 500 can be accessed from within the reports tab 450, in an example. The evaluation screen 500 can provide the user with performance details regarding one or more versions of the new model.

In this example, after the new model has been created through iterative optimization, the new model can be displayed as model 2 and the existing model can be displayed as model 1. Both models can be simultaneously displayed so that the user can see how deployment of the new model would impact performance. In this example, model 1 information 510 is organized above model 2 information 520. This can be based on model 1 being the existing model or it can be done because model 1 is more accurate than model 2.

The models can be based on different machine learning algorithms. In this example, model 1 is based on perceptron whereas model 2 is based on logistic regression. Different algorithms can excel at recognizing different types of patterns.

In this example, the models are presented with loss function optimization plots 512, 522. These plots 512, 522 can illustrate the optimization that took place for each model in arriving at a final model at a particular iteration. In this case, iteration 6 of each model is compared.

Each model can also have a metrics pane 514, 524, where the user can view metrics that have been selected as important considerations for model deployment. As shown, both models have more than 70 percent accuracy, meaning both models would qualify for deployment based on the example configuration criteria of FIG. 4. However, model 1 is more accurate than model 2. In one example, the user can restrict auto-deployment of new models to those that are more accurate than the existing model. In such a case, new model 2 would not be auto deployed since it has less accuracy than the existing model, even though the new model does meet the other configuration criteria 115 requiring 70 percent accuracy.

Metrics shown in panes 514 and 524 can include accuracy, precision, recall, F1 score, variance, mean, and standard deviation. Accuracy can measure the number of correct predictions versus the number of total predictions. Accuracy can also be weighted based on true positives and true negatives versus false positives and false negatives, in an example. Precision can indicate the number of true positives divided by the total number of true and false positives. In other words, it can indicate the number of items correctly labeled as belonging to the positive class divided by the sum of all items labeled as belonging to the positive class. High precision can indicate that a model returned substantially more relevant results than irrelevant ones. Recall can indicate the number of true positives divided by the number of true positives and false negatives. High recall can mean that the model returned most of the relevant results. F1 score can be a harmonic mean of the precision and recall. For example, F1 score can be calculated based on two multiplied by precision multiplied by recall and divided by the sum of precision and recall. F1 score can be used to mitigate the impact of large outliers.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for machine learning using an intelligent continuous learning service, comprising:
   receiving, on a graphical user interface ("GUI"), a selection of configuration criteria for retraining an existing model with a new dataset, the existing model being trained by machine learning on a prior dataset, wherein the configuration criteria comprise:
      an automatic deployment option that, when selected by a user, enables automatic deployment of the new model to a production environment based on the new model surpassing a performance threshold; and
      a performance threshold field that allows the user to specify the performance threshold;
   determining a transfer loss for a new model without using the prior dataset, including determining a first loss for the new model using a new dataset and a second loss for the existing model using the new dataset, wherein the transfer loss is a combination of the first and second losses, wherein the second loss is scaled based on a balancing parameter, and wherein the balancing parameter is adjusted to decrease the transfer loss;
   displaying, on the GUI, an evaluation of the new model over multiple iterations with regard to transfer loss; and
   in an instance where the new model meets the specified performance threshold, automatically deploying the new model to the production environment in place of the existing model.

2. The method of claim 1, wherein the GUI further comprises an automatic training option that, when selected by the user, enables automatic retraining of the new model based on a time interval.

3. The method of claim 1, further comprising:
   generating multiple versions of the new model, wherein at least two different versions of the new model differ based on a value of the balancing parameter or a loss function used to determine the second loss,
   wherein automatically deploying the new model includes deploying a version that has a highest performance metric among the different versions and meets the specified performance threshold.

4. The method of claim 3, wherein the different versions of the new model are optimized by changing parameters used to create the new model, and wherein automatic deployment is contingent on the new model meeting a performance metric of the existing model.

5. The method of claim 1, wherein the GUI further comprises a scheduling element providing a plurality of options for selection by the user, the plurality of options including different time intervals for retraining the new model.

6. The method of claim 1, wherein determining the transfer loss includes:
multiplying the loss balancing parameter by the second loss, wherein the second loss is determined with inputs of a predicted label for the new model and a predicted label for the old model, wherein both predicted labels are based on using the new dataset; and
summing the first loss with the scaled second loss.

7. The method of claim 1, wherein the first loss and the second loss are calculated using one of a means-squared error loss function, entropy loss function, and a root-squared error loss function.

8. A non-transitory, computer-readable medium containing instructions that, when executed by a hardware-based processor, performs stages for machine learning using an intelligent continuous learning service, the stages comprising:
receiving, on a graphical user interface ("GUI"), a selection of configuration criteria for retraining an existing model with a new dataset, the existing model being trained by machine learning on a prior dataset, wherein the configuration criteria comprise:
an automatic deployment option that, when selected by a user, enables automatic deployment of the new model to a production environment based on the new model surpassing a performance threshold; and
a performance threshold field that allows the user to specify the performance threshold;
determining a transfer loss for a new model without using the prior dataset, including determining a first loss for the new model using a new dataset and a second loss for the existing model using the new dataset, wherein the transfer loss is a combination of the first and second losses, wherein the second loss is scaled based on a balancing parameter, and wherein the balancing parameter is adjusted to decrease the transfer loss;
displaying, on the GUI, an evaluation of the new model over multiple iterations with regard to transfer loss; and
in an instance where the new model meets the specified performance threshold, automatically deploying the new model to the production environment in place of the existing model.

9. The non-transitory, computer-readable medium of claim 8, wherein the GUI further comprises an automatic training option that, when selected by the user, enables automatic retraining of the new model based on a time interval.

10. The non-transitory, computer-readable medium of claim 8, the stages further comprising:
generating multiple versions of the new model, wherein at least two different versions of the new model differ based on a value of the balancing parameter or a loss function used to determine the second loss,
wherein automatically deploying the new model includes deploying a version that has a highest performance metric among the different versions and meets the specified performance threshold.

11. The non-transitory, computer-readable medium of claim 10, wherein the different versions of the new model are optimized by changing parameters used to create the new model, and wherein automatic deployment is contingent on the new model meeting a performance metric of the existing model.

12. The non-transitory, computer-readable medium of claim 8, wherein the GUI further comprises a scheduling element providing a plurality of options for selection by the user, the plurality of options including different time intervals for retraining the new model.

13. The non-transitory, computer-readable medium of claim 8, wherein determining the transfer loss includes:
multiplying the loss balancing parameter by the second loss, wherein the second loss is determined with inputs of a predicted label for the new model and a predicted label for the old model, wherein both predicted labels are based on using the new dataset; and
summing the first loss with the scaled second loss.

14. The non-transitory, computer-readable medium of claim 8, wherein the first loss and the second loss are calculated using one of a means-squared error loss function, entropy loss function, and a root-squared error loss function.

15. A system for machine learning using an intelligent continuous learning service, comprising:
a memory storage including a non-transitory, computer-readable medium comprising instructions; and
a computing device including a hardware-based processor that executes the instructions to carry out stages comprising:
receiving, on a graphical user interface ("GUI"), a selection of configuration criteria for retraining an existing model with a new dataset, the existing model being trained by machine learning on a prior dataset, wherein the configuration criteria comprise:
an automatic deployment option that, when selected by a user, enables automatic deployment of the new model to a production environment based on the new model surpassing a performance threshold; and
a performance threshold field that allows the user to specify the performance threshold;
determining a transfer loss for a new model without using the prior dataset, including determining a first loss for the new model using a new dataset and a second loss for the existing model using the new dataset, wherein the transfer loss is a combination of the first and second losses, wherein the second loss is scaled based on a balancing parameter, and wherein the balancing parameter is adjusted to decrease the transfer loss;
displaying, on the GUI, an evaluation of the new model over multiple iterations with regard to transfer loss; and
in an instance where the new model meets the specified performance threshold, automatically deploying the new model to the production environment in place of the existing model.

16. The system of claim 15, wherein the GUI further comprises an automatic training option that, when selected by the user, enables automatic retraining of the new model based on a time interval.

17. The system of claim 15, the stages further comprising:
generating multiple versions of the new model, wherein at least two different versions of the new model differ based on a value of the balancing parameter or a loss function used to determine the second loss,
wherein automatically deploying the new model includes deploying a version that has a highest performance metric among the different versions and meets the specified performance threshold.

18. The system of claim 17, wherein the different versions of the new model are optimized by changing parameters used to create the new model, and wherein automatic deployment is contingent on the new model meeting a performance metric of the existing model.

19. The system of claim 15, wherein the GUI further comprises a scheduling element providing a plurality of options for selection by the user, the plurality of options including different time intervals for retraining the new model.

20. The system of claim 15, wherein determining the transfer loss includes:
   multiplying the loss balancing parameter by the second loss, wherein the second loss is determined with inputs of a predicted label for the new model and a predicted label for the old model, wherein both predicted labels are based on using the new dataset; and
   summing the first loss with the scaled second loss.

* * * * *